United States Patent [19]

Underwood

[11] Patent Number: 4,779,992
[45] Date of Patent: Oct. 25, 1988

[54] LIME SLAKER

[75] Inventor: David T. Underwood, Birmingham, Ala.

[73] Assignee: Dravo Corporation, Pittsburgh, Pa.

[21] Appl. No.: 57,798

[22] Filed: Jun. 3, 1987

[51] Int. Cl.[4] .............................................. B01F 15/02
[52] U.S. Cl. ................................... 366/137; 366/297; 366/312
[58] Field of Search ............... 366/136, 137, 292, 297, 366/298, 299, 300, 309, 279, 301, 302, 303, 325, 159, 160, 161, 312

[56] References Cited

U.S. PATENT DOCUMENTS

| | | | |
|---|---|---|---|
| 1,722,433 | 7/1929 | Kirschbraun | 366/136 |
| 3,307,915 | 3/1967 | Conroy et al. | 23/277 |
| 3,322,505 | 5/1967 | Weber | 23/259.1 |
| 3,607,101 | 9/1971 | Cochran | 23/260 |
| 3,746,267 | 7/1973 | Myers | 366/298 |
| 4,366,142 | 12/1982 | Kojima et al. | 423/640 |
| 4,389,376 | 6/1983 | Kojima et al. | 423/228 |
| 4,436,703 | 3/1984 | Lane | 423/225 |
| 4,474,254 | 10/1984 | Etter | 366/136 |
| 4,693,609 | 9/1987 | Haynes | 366/136 |

OTHER PUBLICATIONS

The DENVER TM Lime Slaking System, Denver Equipment Division of Joy Manufacturing Company, Bulletin No. LS1-A1.
Wallace & Tiernan ® Paste-Type Lime-Slaking Systems, Series A-758, Wallace & Tiernan Division of Pennwalt Corporation, Cat. File 330.100.
Dixie-Cahaba Slaking Systems brochure, Dixie-Cahaba Mfg. Co., Inc.

Primary Examiner—Robert W. Jenkins
Attorney, Agent, or Firm—Parmelee, Miller, Welsh & Kratz

[57] ABSTRACT

A slaker includes a substantially straight, circular sidewall, a substantially flat bottom, and a top. A solid and a liquid feed inlet are disposed at the top of the vessel and an outlet is disposed at the bottom of the vessel. Apparatus is provided for mixing the solid and the liquid within the vessel at high speed and separate apparatus is provided for sweeping the bottom and sidewall of the vessel at low speed. The mixing apparatus and the sweeping apparatus apply substantially only horizontal forces to the solid and the liquid being mixed within the vessel. The slaker further includes apparatus for recirculating at least a portion of the solid and the liquid being mixed within the vessel which flows through the outlet and apparatus for discharging the resultant mixed solid and liquid from the slaker.

9 Claims, 3 Drawing Sheets

LIME SLAKER

BACKGROUND OF THE INVENTION

The invention relates to a method and apparatus for the continuous preparation of a slurry of a liquid and a solid compatible with the liquid and, more particularly to an aqueous slurry of calcium hydroxide.

Generally, such apparatus includes a mixing vessel and beaters for agitating the contents of the vessel. Many are adapted for continuous mixing processes rather than batch processes by providing a continuous feed and discharge. Often, in such apparatus, large solid particles are not properly mixed within the slurry and settle, particularly on the bottom of the vessel and on grates through which the slurry flows. Further, many such apparatus have seals and bearings in contact with the slurry, which contains abrasive materials. It is, therefore, desired to develop a mixing vessel which eliminates the above-mentioned drawbacks of the prior art.

SUMMARY OF THE INVENTION

The slaker of the present invention provides continuous mixing of a solid and a compatible liquid. Preferably, the solid is lime and the liquid is water. However, any solid and compatible liquid in which the solid can be mixed to form a slurry can be used.

The slaker includes a vessel having a substantially straight, circular sidewall, a substantially flat bottom, and a top. A solid and a liquid feed inlet are disposed at the top of the vessel and an outlet is disposed at the bottom of the vessel. Apparatus is provided for mixing the solid and the liquid within the vessel at high speed and separate apparatus is provided for sweeping the bottom and sidewall of the vessel at low speed. The mixing apparatus and the sweeping apparatus apply substantially only horizontal forces to the solid and the liquid being mixed within the vessel. The slaker further includes apparatus for recirculating at least a portion of the solid and the liquid being mixed within the vessel which flows through the outlet and apparatus for discharging the resultant mixed solid and liquid from the slaker.

Preferably, the mixing apparatus includes at least one high speed beater, each high speed beater having a rotatable shaft extending vertically downwardly within the vessel to just above the bottom of the vessel and a plurality of blades extending horizontally outwardly from the shaft along the vertical axis of the shaft in a plurality of horizontal planes.

Preferably, the sweeping apparatus includes a rotatable shaft extending vertically downwardly within the center of the vessel to just above the bottom of the vessel, and at least one blade, each blade having a bottom sweeping portion extending horizontally outwardly from the bottom of the shaft along the bottom of the vessel to just before the sidewall of the vessel and a sidewall sweeping portion extending vertically upwardly along the sidewall of the vessel from the bottom sweeping portion of the blade.

More preferably, the mixing apparatus includes two high speed beaters, one beater being disposed in close proximity to the rotatable shaft of the sweeping apparatus to prevent solid material from building up on the rotatable shaft and the other beater being disposed in close proximity to the sidewall of the vessel to prevent solid material from building up on the sidewall sweeping portion of the blade of the sweeping apparatus and both high speed beaters extending downwardly within the vessel sufficiently to prevent solid material from building upon the bottom sweeping portion of the blade of the sweeping apparatus.

The process of the present invention provides continuous mixing of a solid and a compatible liquid to form a slurry of any predetermined flowing consistency. The solid and the liquid feeds are each continuously introduced into the top of the vessel through the inlet means at a predetermined rate. In the case of solids that contain insolubles, or otherwise deleterious materials, the ratio of solids/liquid feeds should be such that the resulting slurry is heavy enough and vicious enough to inhibit the fallout of the deleterious materials. Simultaneously with the continuous feeding, the solid and the liquid are mixed by the mixing apparatus to form the slurry. The slurry, and any deleterious material carried by the slurry, is continuously withdrawn from the bottom of the vessel through the recirculating apparatus and, until the vessel is filled, returned to the vessel through the bottom of the vessel. After the vessel is filled to the set operating liquid level each incoming increment of feed will displace its equivalent volume of slurry from the bottom of the vessel and eventually out of the slaker through the discharge apparatus, thus maintaining a constant volume within the slaker during normal operation. Because of the constant volume of material within the slaker, and the fact that the mixing and sweeping means do not apply a vertical force to the material, the increments of feed travel downward from the top surface of the slurry towards the bottom outlet at a controlled rate, that rate being governed by the predetermined feed rate.

Simultaneously with the continuous feeding, the solid and liquid are continuously mixed in the vessel at high speed with the mixing means to continuously form a slurry, the sidewall and the bottom of the vessel are continuously swept at low speed with the sweeping means, the slurry is continuously discharged from the vessel to the recirculation means through the outlet means, a portion of the slurry flowing from the vessel is continuously discharged from the slaker at a rate equal to the predetermined feed rate and the remainder of the slurry flowing from the vessel is continuously returned to the vessel in the incidental agitation zone (dead space), near the outlet means.

The invention provides apparatus and a process by which a solid and a liquid can be mixed thoroughly and efficiently with a minimum of wear on the equipment, there being no seals or bearings under the level of the slurry.

DETAILED DESCRIPTION OF THE PREFERRED EMBODIMENT

Figure 1:
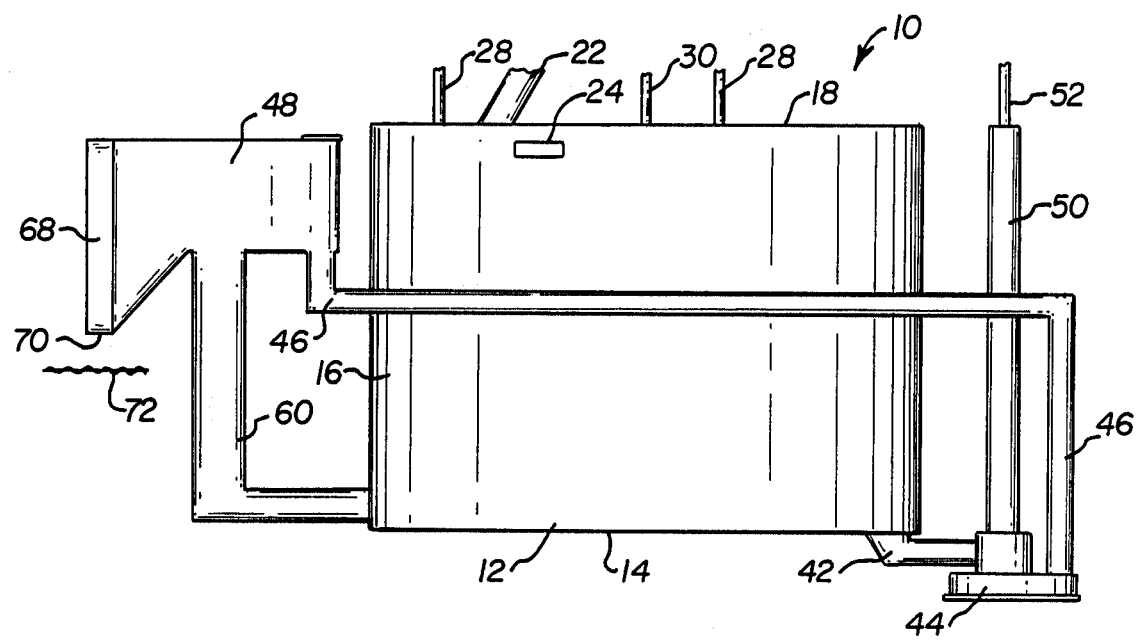
FIG. 1 is a side plan view of a slaker of the present invention.
Figure 2:
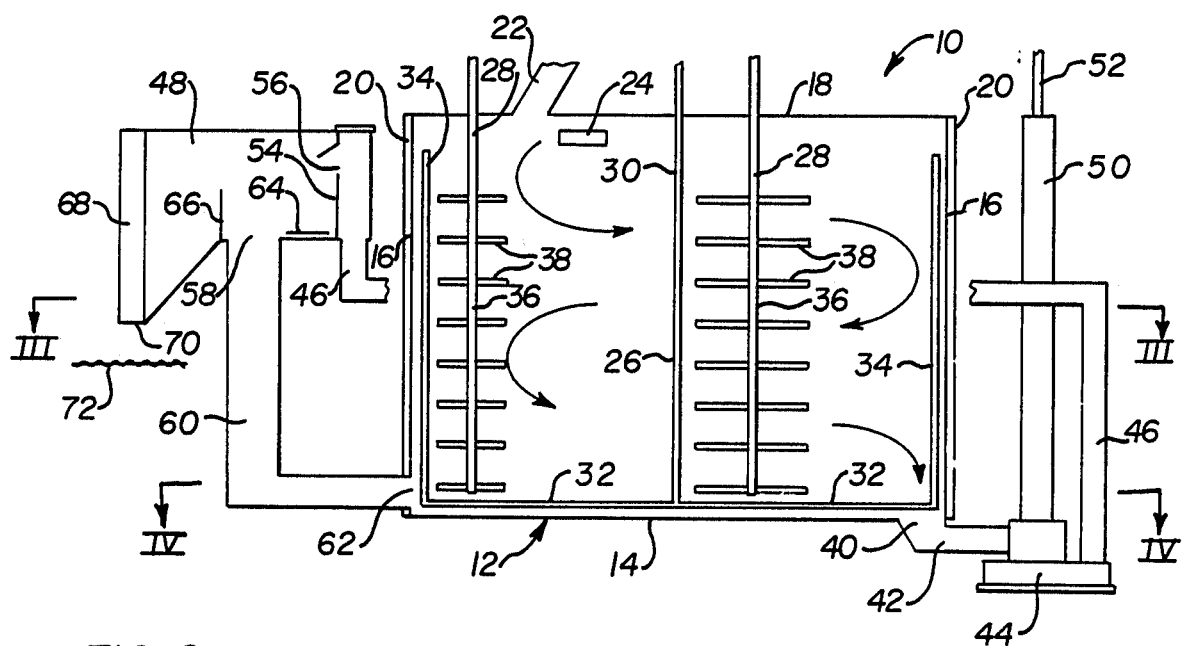
FIG. 2 is a side sectional view of the slaker shown in FIG. 1.
Figure 3:
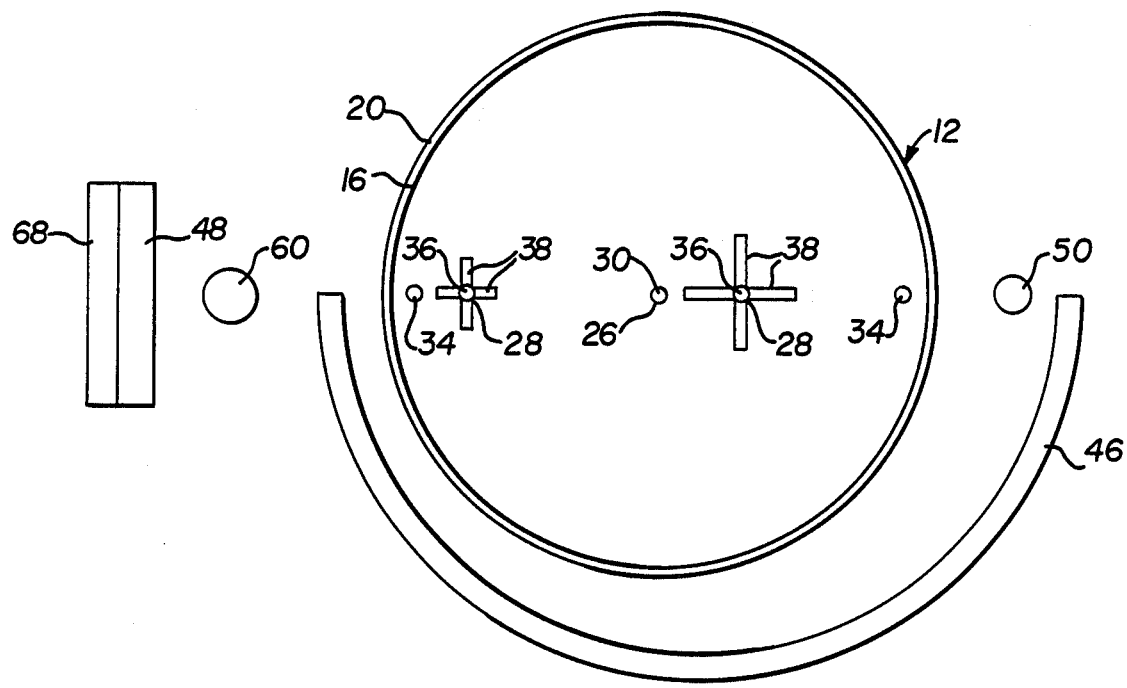
FIG. 3 is a sectional view of the slaker as shown in FIG. 2 taken along the line III—III of FIG. 2.
Figure 4:
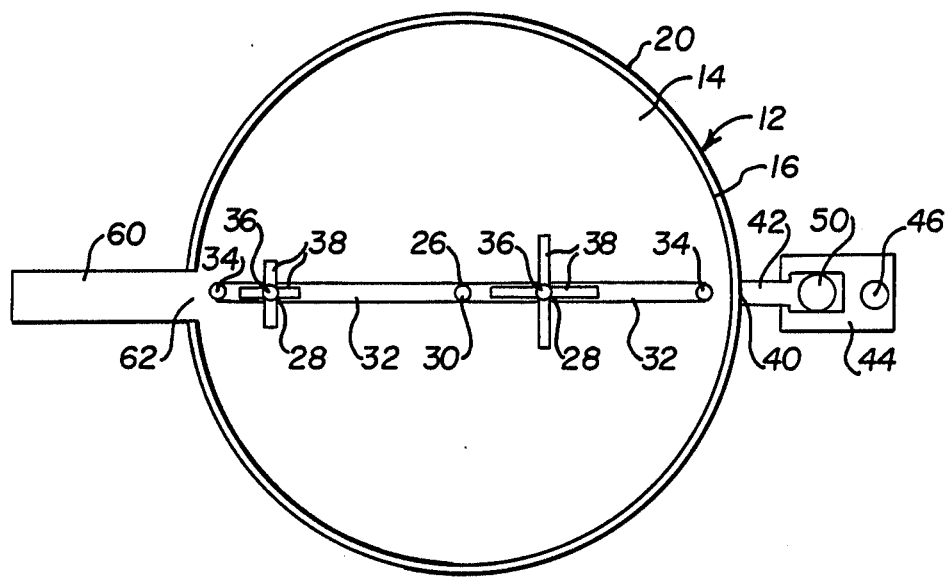
FIG. 4 is a sectional view of the slaker as shown in FIG. 2 taken along the line IV—IV of FIG. 2.

A slaker 10 includes a mixing vessel 12 which has a substantially flat bottom 14, a substantially straight, circular sidewall 16 and a top 18. Thus, the mixing vessel 12 has a substantially uniform circular cross-section. The top 18 of the vessel 12 is covered by a lid (not shown) thus enclosing the vessel 12. The circular sidewall 16 of the mixing vessel 12 can be surrounded by a water jacket 20.

Solid matter is introduced to the mixing vessel 12 through a solid feed inlet 22, located in the top 18 of the mixing vessel 12. Liquid matter is introduced to the mixing vessel 12 through a liquid feed inlet 24, located near the top of the mixing vessel 12 above the full level of the contents of the mixing vessel 12. Preferably, the solid is lime and the liquid is water. The lime can be in the form of quicklime or hydrated lime. However, any combination of compatible solids and liquids will do. If the solids contain insolubles, or otherwise deleterious materials, the ratio of solid to liquid feeds should be such that the resulting slurry in heavy enough and vicious enough to inhibit the fallout of the deleterious materials.

The contents of the mixing vessel 12 are mixed by a low speed sweeper 26 and at least one high speed beater 28. The sweeper 26 and the beaters 28 are rotated by any suitable drive means (not shown) and operate so as to apply substantially only horizontal forces to the slurry formed in the mixing vessel 12.

The low speed sweeper 26 rotates about a rotating shaft 30 extending downwardly in the center of the main vessel 12, preferably until just above the bottom 14 of the vessel 12 and includes bottom blades 32, preferably extending horizontally outwardly from the bottom of the shaft 30 along the bottom 14 of the main vessel 12 to just before the sidewall 16 of the main vessel 12 and side blades 34, preferably extending vertically upwardly along the sidewall 16 of the main vessel 12 from the outer edges of the bottom blades 32. The sweeper 26 rotates at from about 5 to about 12 revolutions per minute. The blades 32 and 34 are close enough to the bottom 14 and sidewall 16, respectively, of the mixing vessel 12 to prevent any substantial build up of solid material, but are not so close as to crush the largest solid particles fed into the mixing vessel 12.

The primary mixing of the contents of the mixing vessel 12 is accomplished by one or more high speed beaters 28. Each high speed beater 28 includes a rotating shaft 36 extending vertically downwardly within the mixing vessel 12 to just above the bottom blades 32 of the low speed sweeper 26, which is defined as the active mixing depth. The depth below the active mixing depth is referred to as dead space. The beaters 28 rotate at from about 150 to about 350 revolutions per minute. A plurality of blades 38 extend horizontally from the shaft 36 in a plurality of evenly spaced horizontal planes along the vertical axis of the shaft 36. Preferably two blades 38 extend from the shaft 36 at 180 degree intervals in each horizontal plane. A sufficient number of beaters 28 are included to effectively mix the contents of the mixing vessel 12 without creating turbulence. Preferably, the contents of the mixing vessel 12 are mixed by two high speed beaters 28. One of the beaters 28 should be in close proximity to the side blades 34 of the sweeper 26 to prevent solid material from building up on the blades 34 of the sweeper 26. The other beater 28 should be in close proximity to the shaft 30 of the sweeper 26 to prevent solid material from building up on the shaft 30 of the sweeper 26. Both beaters 28 should extend downwardly within the mixing vessel 12 sufficiently to prevent solid material from building up on the blades 32 of the sweeper 26.

The slurry formed in the mixing vessel 12 is discharged through an outlet 40 to an outlet conduit 42 extending from the bottom 14 of the mixing vessel 12. A pump 44 circulates the slurry from the outlet conduit 42 through a conduit 46 to a weir box 48. The pump 44 is preferably a nonclogging, open impeller, centrifugal pump fabricated from abrasion resistant steel and designed to pass the largest insoluble particle fed into the slaker 10. The pump 44 includes a column 50 and a shaft 52 disposed within the column 50. The pump 44 must have the capacity to lift the slurry from the bottom of the mixing vessel 12 to the weir box 48 when the system is being filled or emptied. In normal operation, the pump 44 maintains a steady flow from the bottom of the mixing vessel 12 to the weir box 48 at a relative zero head. The capacity of the pump 44 should be greater than the expected output of the slaker 10.

The weir box 48 includes a vertical wall 54 having an inlet 56 through which the slurry enters the weir box 48 from the conduit 46. The slurry is then returned to the mixing vessel 12 from the weir box 48 through an outlet 58 in the weir box 48 and a conduit 60, which connects with the mixing vessel 12 at a recirculation inlet 62 in the bottom of the sidewall 16. The inlet 62 in the sidewall 16 is located in the dead space, or below the active mixing depth of the mixing vessel 12. A slide plate 64 in the weir box 48 is adapted to cover the outlet 58 to the conduit 60, from the weir box 48 when the mixing vessel 12 is being emptied. A weir 66 in the weir box 48 provides a barrier over which the output slurry flows to an exiting chamber 68. The slurry from the exiting chamber 68 then flows through a discharge outlet 70 over a screen 72 to separate the finished product from scalped material which is retained on the sreen 72.

In a preferred operation of the slaker 10, the mixing vessel 12 is filled with water until the pump 44 can maintain a steady flow of water from the mixing vessel 12 through the outlet 40, the conduit 42, the conduit 46, the weir box 48, the conduit 60 and back to the mixing vessel 12 through the inlet 62 without cavitating. The sweeper 26 and the beaters 28 are then actuated. The liquid and solid feeds are then turned on so that the solid feed enters the mixing vessel 12 through the solid feed inlet 22 and the liquid enters through the liquid feed inlet 24. At this point, all of the slurry is being recirculated from the weir box 48 to the mixing vessel 12 through the conduit 60. None of the slurry is flowing over the weir 66 to the exiting chamber 68. When the volume of the slurry has increased to the point that the top level of the slurry reaches the level of the top of the weir 66 so that additional feed will cause the slurry to flow over the weir 66, the feed is stopped and the slurry is circulated until the temperature of the slurry in the mixing vessel 12 reaches at least about 160° F. due to the exothermic nature of the reaction occurring within the mixing vessel 12. The feeds are again turned on at the predetermined feed rate. The level of the slurry in the vessel 12, and the weir box 48, will rise to the extent that the slurry flowing over the weir 66 into the exiting chamber 68 equals the feed input rate.

As an increment of feed is dropped on to the top surface of the slurry in the mixing vessel 12, it is absorbed into the slurry and immediately begins to swirl around the interior of the mixing vessel 12. The resulting slurrified material displaces its equivalent mass of slurry from the mixing vessel 12 through the outlet 40, through the slaker 10, over the weir 66 and through the existing chamber 68 and discharge outlet 70. Thus, a constant volume is maintained within the slaker 10 during normal operation. Because of the constant volume of material within the slaker 10 and the fact that the sweeper 26 and beaters 28 do not apply a vertical force to the increments of feed, the feed descend in the slurry in a relatively smooth helical path from the top surface of the slurry towards the bottom outlet at a controlled rate governed by the predetermined feed rate. During a typical mixing cycle of twelve to fourteen minutes, each increment of material passes through the areas of high speed agitation created by the blades 34 of the beaters 28 from 250 to 500 times.

The mixing cycle is determined by dividing the volume of the mixing vessel by the rate of feed input. The rate of feed input is equal to the desired rate of the slurry output. The relative feed rates of the liquid and solid are determined by the desired concentration of each in the resultant slurry.

For example, if it is desired to slake 5 tons of calcium oxide per hour, to form a aqueous slurry of 27 percent by weight calcium hydrate, the output of the slaker 10 will be approximately 11 cubic feet per minute ($ft^3$/min) assuming a calcium hydrate specific density of approximately 143 pounds per cubic foot. The feed rate will be approximately 167 pounds of calcium oxide in 10.3 $ft^3$/min of water. If a twelve minute slaking cycle is desired, the required net volume of the slaker 10 is obtained by multiplying the length of the proposed mixing cycle (12/60 hour) by the expected slurry production rate (663 $ft^3$/hr.), or 133 cubic feet. Note that the net volume includes only the active mixing depth and does not include the dead space. If the capacity of the pump 44 is 15 $ft^3$/min, during operation, 4 $ft^3$/min slurry, the difference between the discharge from the mixing vessel 12 to the pump 44 through the outlet 40 (15 $ft^3$/min) and the slurry production rate, (11 $ft^3$/min) is being recirculated to the inlet 62 of the mixing vessel 12 from the weir box 48 through the conduit 60. Thus, 11 $ft^3$/min of the slurry is flowing over the weir 66 to the exiting chamber 68 and out of the slaker 10 through the outlet 70.

Figure 5:
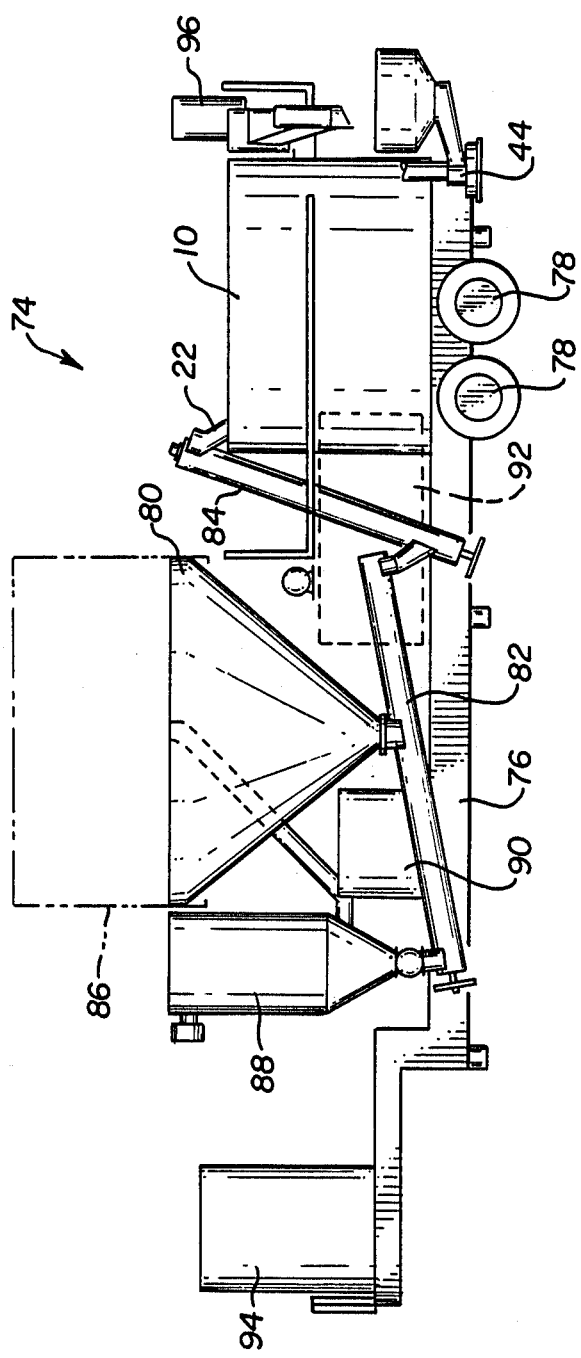
FIG. 5 is a side plan view of a slaking system including a slaker of the present invention.

In a preferred system, shown in FIG. 5, the slaker 10 is part of a portable system. The portable system 74, including the slaker 10, is mounted on a base 76 having wheels 78 to enable the system 74 to be moved between locations. A storage silo 80 is connected to the solid feed inlet 22 by conduits 82 and 84. The storage silo 80 includes a telescoping sidewall 84 shown in phantom in FIG. 5. The sidewall 86 can be extended or retracted as desired to increase or decrease the volume of the silo 80, respectively. A dust collection system includes a dust collector 88 and an air compressor 90. A liquid storage tank 92 is connected to the liquid feed inlet 24. A generator 94 provides the power for operating the slaker 10. The system 74 can be controlled from a control panel 96.

What is claimed is:

1. Apparatus for the continuous slaking of lime in water comprising:
   a vessel having a substantially straight, circular sidewall, a substantially flat bottom, and a top;
   lime inlet means disposed at said top of said vessel;
   water inlet means disposed at said top of said vessel;
   means for mixing said lime and said water within said vessel at high speed including at least one high speed beater, each said high speed beater including a rotatable shaft extending vertically downwardly within said vessel to just above said bottom of said vessel and a plurality of blades extending horizontally outwardly from said shaft along the vertical axis of said shaft in a plurality of horizontal planes;
   means for sweeping said bottom and sidewall of said vessel at low speed including a rotatable shaft extending vertically downwardly within the center of said vessel to just above said bottom of said vessel, and at least one blade, each said blade having a bottom sweeping portion extending horizontally outwardly from the bottom of said shaft along said bottom of said vessel to just before said sidewall of said vessel and a sidewall sweeping portion extending vertically upwardly along said sidewall of said vessel from said bottom sweeping portion of said blade said mixing means and said sweeping means being adapted to apply substantially only horizontal forces to said lime and said water being mixed within said vessel;
   outlet means disposed at said bottom of said vessel;
   a recirculation inlet disposed along said sidewall of said vessel near said bottom of said vessel;
   recirculation means for at least a portion of said lime and said water being mixed within said vessel flowing from said vessel through said outlet means including a housing, a first conduit means from said outlet of said vessel to said housing, pumping means for directing flow through said first conduit means, a second conduit means from said housing to said recirculation inlet of said vessel, and means for separating the flow from said housing between said second conduit means and said discharge means from said apparatus, said discharge means from said apparatus including an outlet in said housing; and
   means for discharging the resultant slaked lime and water from said apparatus.

2. The apparatus or claim 1 wherein said apparatus is mounted on a base having means for moving said base between locations and said apparatus is a part of a system mounted on said base including a storage silo connected to said solid inlet means, said storage silo having a sidewall, dust collection means connected to said storage silo, a liquid storage tank connected to said liquid inlet means, and means of providing electrical power to operate said system.

3. The apparatus of claim 1 wherein said mixing means comprises two high speed beaters, one said beater being disposed in close proximity to said rotatable shaft of said sweeping means to prevent lime from building up on said rotatable shaft and the other said beater being disposed in close proximity to said sidewall of said vessel to prevent lime from building up on said sidewall sweeping portion of said blade of said sweeping means and both said high speed beaters extending downwardly within said vessel sufficiently to prevent lime material from building up on said bottom sweeping portion of said blade of said sweeping means.

4. A process for the continuous mixing of a solid and a liquid compatible with said solid comprising the steps of:
   filling a vessel and recirculation means of an apparatus, said apparatus including a vessel having a substantially straight, circular sidewall, a substantially flat bottom, and a top, solid inlet means disposed at said top of said vessel, liquid inlet means disposed at said top of said vessel, means for mixing said solid and said liquid within said vessel at high speed, means for sweeping said bottom and said sidewall of said vessel at low speed, said mixing means and said sweeping means being adapted to apply substantially only horizontal forces to said solid and said liquid being mixed within said vessel, outlet means disposed at said bottom of said vessel, recirculation means for recirculating at least a portion of said solid and said liquid being mixed within said vessel flowing from said vessel through said outlet means, and means for discharging the resultant mixed solid and liquid from said apparatus, with a feed of a solid and a liquid compatible with said solid until an incremental amount of additional feed would cause discharge from said apparatus through said discharging means;

mixing said solid and said liquid in said vessel in a first mixing step to form a slurry as said slurry is continuously circulated throughout said vessel and said recirculation means of said apparatus;

continuously feeding said solid and said liquid to said slurry in said vessel through said inlet means at a predetermined feed rate; and, simultaneously with said continuous feeding;

continuously mixing said solid and said liquid in said vessel at high speed with said mixing means to continuously form a slurry;

continuously sweeping said sidewall and said bottom of said vessel at low speed with said sweeping means, said mixing and said sweeping applying substantially only horizontal forces to said slurry;

continuously discharging said slurry from said vessel to said recirculation means through said outlet means; - continuously discharging a portion of said slurry flowing from said vessel from said apparatus at a rate equal to said predetermined feed rate; and continuously recirculating the remainder of said slurry flowing from said vessel back to said vessel.

5. The process of claim 4 wherein said solid is lime and said liquid is water.

6. The process of claim 4 wherein said solid and said liquid are mixed in said first mixing step at high speed.

7. The process of claim 6 wherein said sidewall and said bottom of said vessel are swept as said solid and said liquid are mixed in said first mixing step.

8. Apparatus for the continuous mixing of a solid and a liquid compatible with said solid comprising:

a vessel having a substantially straight, circular sidewall, a substantially flat bottom, and a top;

solid inlet means disposed at said top of said vessel;
liquid inlet means disposed at said top of said vessel;
means for mixing said solid and said liquid within said vessel at high speed;

means for sweeping said bottom and sidewall of said vessel at low speed, said mixing means and said sweeping means being adapted to apply substantially only horizontal forces to said solid and said liquid being mixed within said vessel;

outlet means disposed at said bottom of said vessel;

recirculation means for at least a portion of said solid and said liquid being mixed within said vessel flowing from said vessel through said outlet means; and means for discharging the resultant mixed solid and liquid from said apparatus;

said apparatus being mounted on a base having means for moving said base between locations and said apparatus being part of a system mounted on said base including a storage silo connected to said solid inlet means, said storage silo having a telescoping sidewall, dust collection means connected to said storage silo, a liquid storage tank connected to said liquid inlet means, and means of providing electrical power to operate said system.

9. Apparatus for the continuous mixing of a solid and a liquid compatible with said solid comprising;

a vessel having a substantially straight, circular sidewall, a substantially flat bottom, and a top;
solid inlet means disposed at said top of said vessel;
liquid inlet means disposed at said top of said vessel;
means for mixing said solid and said liqud within said vessel at high speed;

means for sweeping said bottom and sidewall of said vessel at low speed, said mixing means and said sweeping means being adapted to apply substantially only horizontal forces to said solid and said liquid being mixed within said vessel;

outlet means disposed at said bottom of said vessel;
a recirculation inlet disposed along said sidewall of said vessel near said bottom of said vessel; and recirculation means for at least a portion of said solid and said liquid being mixed within said vessel flowing from said vessel through said outlet means, said recirculation means including a housing, a first conduit means from said outlet of said vessel to said housing, pumping means for directing flow through said first conduit means, a second conduit means from said housing to said recirculation inlet of said vessel, and means for separating the flow from said housing between said second conduit means and a means for discharging the resultant mixed solid and liquid from said apparatus, said discharge means including an outlet in said housing.

* * * * *